US 6,640,284 B1

(12) United States Patent
Shaw et al.

(10) Patent No.: US 6,640,284 B1
(45) Date of Patent: Oct. 28, 2003

(54) SYSTEM AND METHOD OF DYNAMIC ONLINE SESSION CACHING

(75) Inventors: Venson M. Shaw, Plano, TX (US); Syed A. Hussain, Richardson, TX (US); Charles M. Dimitry, Ottawa (CA); Van Mardian, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 451 days.

(21) Appl. No.: 09/745,812

(22) Filed: Dec. 21, 2000

Related U.S. Application Data
(60) Provisional application No. 60/203,761, filed on May 12, 2000.

(51) Int. Cl.[7] .............................................. G06F 12/00
(52) U.S. Cl. ...................... 711/129; 711/137; 711/173; 209/215; 209/216
(58) Field of Search ................................. 711/122, 127, 711/129, 130, 133, 137, 173, 134, 136, 154, 159, 160, 118, 153; 209/213, 215, 216; 463/40, 41, 42

(56) References Cited

U.S. PATENT DOCUMENTS 4,476,526 A * 10/1984 Dodd .......................... 711/113
6,286,084 B1 * 9/2001 Wexler et al. ............... 711/152
6,360,300 B1 * 3/2002 Corcoran et al. ........... 711/139
6,507,895 B1 * 1/2003 Wang et al. ................. 711/137

OTHER PUBLICATIONS

Ng, "Designing Fast–Action Games For The Internet", Sep. 5, 1997, p. 1–9.*

* cited by examiner

*Primary Examiner*—Donald Sparks
*Assistant Examiner*—Brian R. Peugh
(74) *Attorney, Agent, or Firm*—Wei Wei Jeang; Munsch Hardt Kopf & Harr, P.C.

(57) ABSTRACT

The present invention provides a system that includes a plurality of cache engines coupled to a computer network such as the Internet, and a cache memory associated with each of the plurality of cache engines. The cache memory is allocated to store information of a plurality of users participating in an online communication session. Each user is allocated a normal section and an exception section in the cache memory, the normal section storing predictable behavior of the user and the exception section storing unpredictable behavior of the user. All users' session environment is updated by sending information on whether a specific user's behavior is predictable or unpredictable and by retrieving the appropriate user behavior from the normal or exceptions sections in the local cache memory.

28 Claims, 5 Drawing Sheets

SYSTEM AND METHOD OF DYNAMIC ONLINE SESSION CACHING

CROSS-REFERENCE TO RELATED APPLICATION

This patent application claims the benefit of Provisional Patent Application, Ser. No. 60/203,761, entitled Distributed Broadband Access Network Architecture System and Method, filed on May 12, 2000, the disclosure of which is incorporated herein by reference. This patent application is further related to co-pending U.S. patent application, Ser. No. 09/745,812, entitled System and Method of Personalizing Communication Sessions Based on User Behavior, filed on Dec. 21, 2000, the disclosure of which is incorporated herein by reference.

TECHNICAL FIELD OF THE INVENTION

This invention relates to the Internet, and more particularly, to a system and method of dynamic online session caching.

BACKGROUND OF THE INVENTION

Public groupware and multi-user gaming are popular new Internet applications. Applications such as online gaming is important to broadband emerging service providers (broadband ESP) today because they make an Internet site "sticky." The metric by which Internet sites are valued today is not only the number of hits per day but also by the average amount of time a user spends at the site (stickiness). E-gaming provides content that not only increases the number of hits, but also makes a user linger at the site. Furthermore, the longer users stay at a site, the more targeted or untargeted advertisement can be shown to the users, which translates to more revenue opportunities. Online gaming also creates the feeling of an online community that allows the broadband ESP to bundle other broadband premium services like video, streaming advertisements, music, etc.

Despite the rosy prospects, current online application functionality and performance are limited and unappealing because the users find the current environment to have jerky interaction, infrequent screen updates, unacceptably slow speed, and lack of realism. These problems are primarily due to the lack of bandwidth over the Internet. Currently, when two or more users participate in the same multi-user session, each user has to be logged in at a central computer server. Therefore, the capacity of the central computer server becomes a constraint on the number of users that can participate simultaneously. The central server becomes a bottleneck and the architecture is not easily scalable to accommodate more users. In addition to bandwidth issues, the delivery speed of web content is insufficient to make the current environment truly dynamic and interactive. As a result, although a community of online game players currently participate and play games over the Internet, their numbers have been limited to an exclusive hard core group of users.

SUMMARY OF THE INVENTION

It may be seen from the foregoing that it would be desirable to speed up web content delivery to the users by anticipating or predicting, to some extent, the web content needed by the users.

In accordance with an embodiment of the present invention, the present invention provides a system that includes a plurality of cache engines coupled to a computer network such as the Internet, and a cache memory associated with each of the plurality of cache engines. The cache memory is allocated to store information of a plurality of users participating in an online communication session. Each user is allocated a normal section and an exception section in the cache memory, the normal section storing predictable behavior of the user and the exception section storing unpredictable behavior of the user. All users' session environment is updated by sending information on whether a specific user's behavior is predictable or unpredictable and by retrieving the appropriate user behavior from the normal or exceptions sections in the local cache memory.

In accordance with another embodiment of the present invention, a method includes the steps of allocating cache memory space for each user participating in an online communication session, dividing the allocated cache memory space for each user into a normal section for storing predictable user behavior and an exception section for storing unpredictable user behavior, and synchronizing the online communication session for all the users by sending information regarding whether a specific user's behavior is predictable or unpredictable and retrieving appropriate cached user behavior.

In accordance with yet another embodiment of the present invention, a cache engine includes a cache memory, which is allocated to store information of a plurality of users participating in an online communication session. Each user is allocated a normal section and an exception section in the cache memory, where the normal section stores predictable behavior of the user and the exception section stores unpredictable behavior of the user. A normal/exception handler is operable to determine whether a user's behavior is predictable or unpredictable and which cached user behavior is to be multicasted to the other users.

In accordance with yet another embodiment of the present invention, a computer-readable medium storing a method includes the steps of determining a normal section memory size for storing predictable player behavior and an exception section memory size for storing unpredictable player behavior for each player participating in an online gaming session, dynamically allocating the cache memory space for each player, and synchronizing the online gaming session display for all the players by sending information regarding whether a specific player's behavior is predictable or unpredictable, multicasting this information, and retrieving appropriate locally cached player behavior in response to the multicasted information.

The present invention provides the advantage of enabling dynamic and real-time online communication sessions without requiring a large bandwidth. The information transmitted is used to tap into a cache memory of each user to retrieve relevant locally cached user behavior information to update each user's operating environment. The actual user input or player move is not multicasted to each user. As a result, the overall functionality of the web caching concept is greatly improved to handle the dynamic memory allocation and to facilitate the normal and exception conditions during the online session. Implemented in this manner, the online session environment becomes significantly more realistic, dynamic and real-time. The users are therefore more likely to be totally immersed in this environment and online community, which contributes to the hit statistics and "stickiness" of the web site.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

Figure 1:
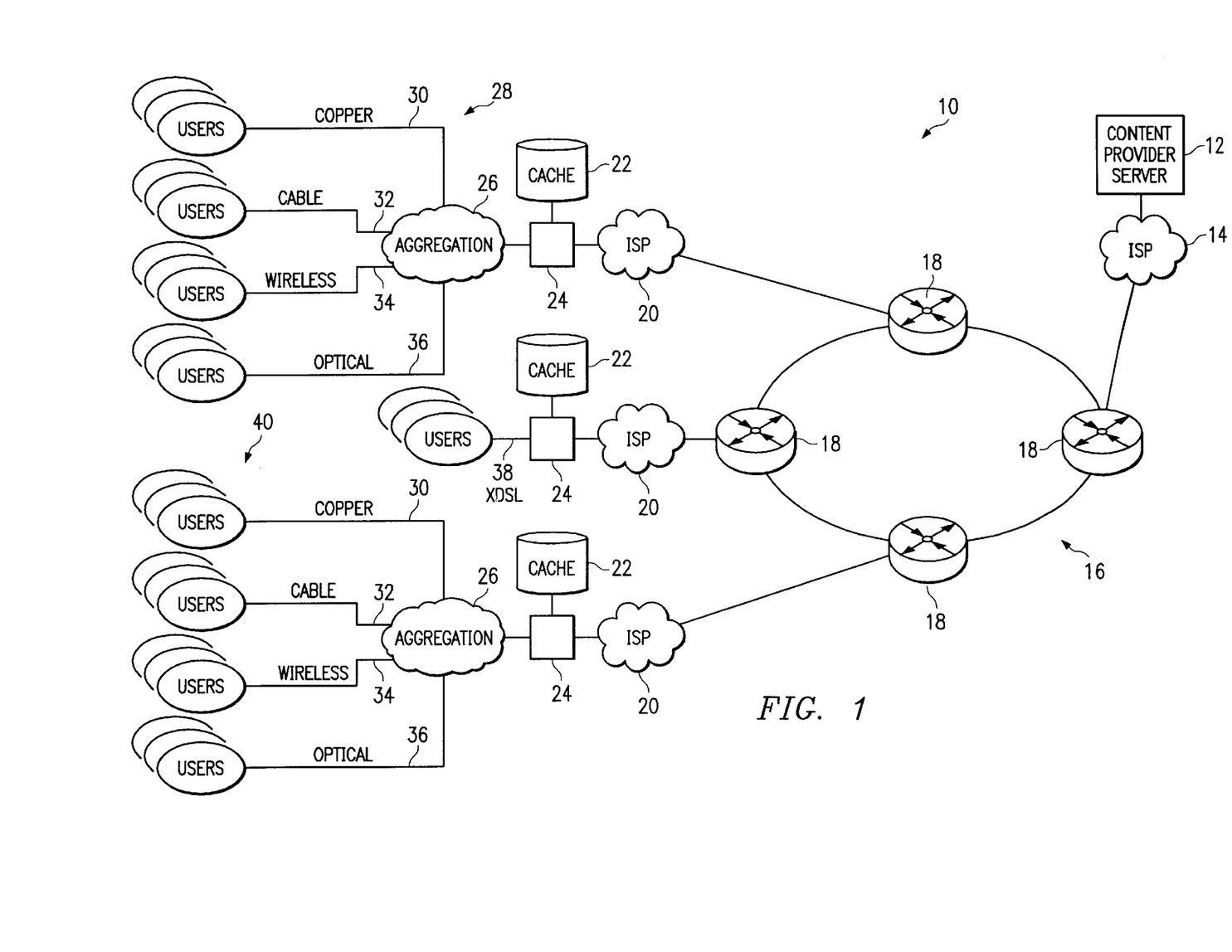
FIG. 1 is a schematic diagram of a preferred embodiment network for sender initiated caching of content.

FIG. 1 is a schematic diagram of a preferred embodiment network 10 for sender initiated caching of content. As shown network 10 preferably comprises a core network 16. The core network 16 is the backbone network and preferably comprises one or more routers 18 for routing data packets between Service Providers, for example Internet Service Providers (ISPs) 20, and content provider server 12. One or more users 40 access information utilizing one or more access modes, such as access over copper lines 30, cable access 32, access over optical lines 36, broadband wireless access 34, xDSL access 38 and/or the like. These access modes are preferably broadband access modes which have the ability to deliver large volumes of digital content to the user. Users 40 can access one or more central offices, local exchange, or access nodes 24 utilizing one or more of the above mentioned access modes. In the preferred embodiment, each central office 24 has an associated cache 22 for storing content. In the preferred embodiment, the content stored at cache 22 is personalized broadband content. Central office 24 is communicatively connected to ISP 20 which communicates with one or more routers 18. One or more content provider servers 12 communicate with one or more ISPs 14. ISP 14 communicates with one or more routers 18 of the core network 16. One or more aggregation modules 26 may be utilized to seamlessly aggregate the various access modes for providing access to the central office 24 especially for users utilizing different types of access nodes. ISP 14 provides content from content provider server 12 to core network 16.

Figure 2:
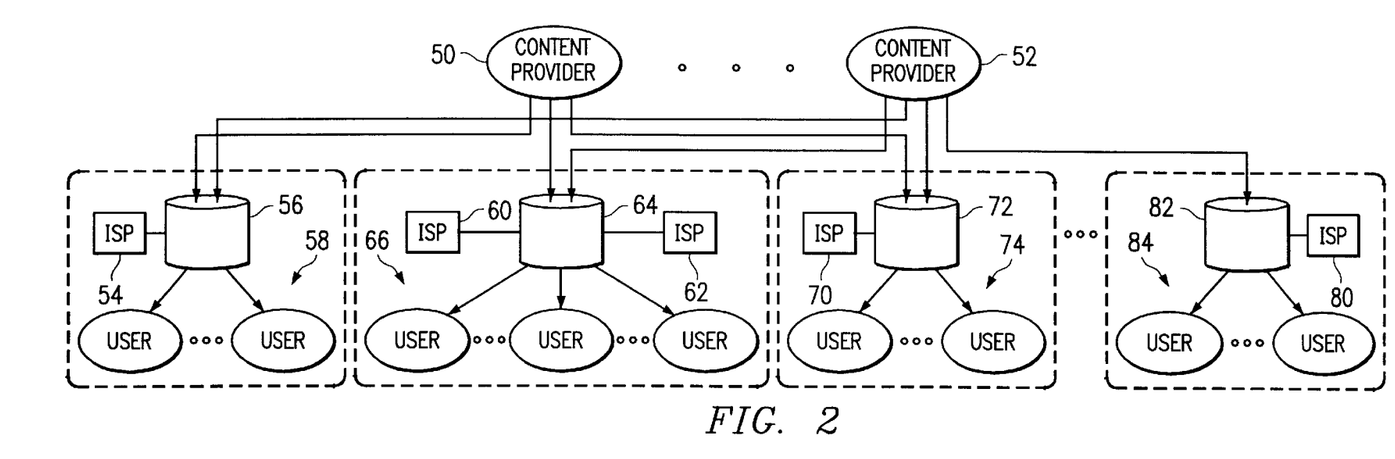
FIG. 2 is a hierarchical representation of sender-initiated caching of content according to the teachings of the present invention.

FIG. 2 is a hierarchical representation of sender-initiated caching of content according to the teachings of the present invention. As shown, at the top of the hierarchical structure are one or more content providers 50, 52. Downstream from the content providers are one or more access providers 54, 60, 62, 70, 80, for example ISPs, local exchange carriers and/or the like. Each access provider is preferably associated with a cache 56, 64, 72, 82. One or more ISPs may be associated with the same cache (for example, ISPs 60 and 62 are shown associated with cache 64) or one ISP may have more than one cache associated with it. Downstream from the ISPs and the caches are the user bases 58, 66, 74, 84. Each user base includes one or more users capable of receiving content from the caches associated with the respective ISPs. Thus, as shown in FIG. 2, user base 58 is associated with cache 56 which is associated with ISP 54; user base 66 is associated with cache 64 which is associated with ISP 60 and ISP 62; user base 74 is associated with cache 72 which is associated with ISP 70; and user base 84 is associated with cache 82 which is associated with ISP 80.

Each ISP preferably stores information about the users associated with the ISP. In the preferred embodiment, the ISP tracks the content provider sites visited by one or more users or the type of content accessed frequently by such one or more users. Thus, if the user typically accesses entertainment content, such as online gaming, from a particular content provider, that information is stored by the ISP and associated with the particular user profile. Utilizing the stored information, such as type of content, geographical location of user, the profile of the user, the demographic profile of the user, the interests of the user in activities, such as entertainment, e-gaming, education, the behavior of the user in activities, such as entertainment, e-gaming, education and/or the like, the ISP can store personalized content in the cache associated with the ISP so that the user can access relevant information quickly. Thus, by personalizing the information stored in the cache, the likelihood that a request for content by a user will be fulfilled by the cache can be substantially increased thereby reducing the latency for the user. This is especially useful in the case of activities and/or applications that are bandwidth intensive, such as interactive commerce, playing online games, watching movies and television shows online, listening to music over the Internet, video on demand, e-learning, video broadcast and/or the like.

In the preferred embodiment, one or more ISPs provide information to the content providers regarding their subscriber base. Based on the received information the content providers may periodically store relevant information at the caches associated with the respective ISP. Thus, unlike the prior art where content from a content provider may be cached upon receiving a request for content from the user, in the preferred embodiment of the present invention, the caching of personalized content is initiated by the content provider preferably based on the profile of one or more users received from the ISP with which the users are associated.

Figure 3:
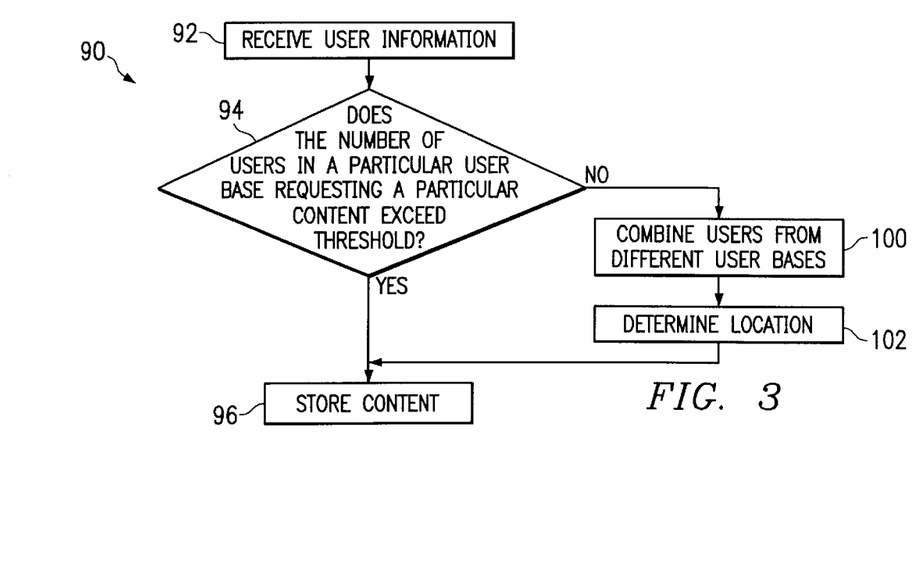
FIG. 3 shows a preferred embodiment flow chart for sender-initiated caching of personalized content.

FIG. 3 shows a preferred embodiment flow chart 90 for sender-initiated caching of personalized content. As shown in step 92 the content provider receives information from one or more ISPs regarding that particular ISPs user base. Such information includes, for example, the profile of each user in the particular user base, including each user's preferences as to content. In the preferred embodiment, in step 94, a determination is made as to whether the number of users from the same user base preferring a particular content exceeds a threshold value. The value of the threshold may be predetermined or may be dynamically determined. If the number of such users exceeds the threshold value, then in step 96, the preferred content is stored in a cache close to the particular ISP, for example, the cache associated with the ISP with which the particular user base is associated. Thus, for example, referring to FIG. 2, if the number of users in user base 58 associated with ISP 54 preferring a particular content exceeds the threshold, then in step 96, the preferred content is stored preferably in cache 56 associated with ISP 54.

However, if the number of users from a particular user base that prefer a particular content does not exceed the threshold, then in step 100, users from different user bases may be combined to exceed the threshold value. In such a case, once the number of users has exceeded the threshold value, the content provider makes a determination (step 102) as to the location of the preferred content. In the preferred embodiment, the determined location is a cache close to the users desiring such content. Thus, for example, referring to FIG. 2, if the number of users from either user base 58 or user base 66 preferring a particular content does not exceed the threshold value, but when combined the number of users preferring the particular content from the two user bases 58 and 66 exceeds the threshold value, then in step 102, the content provider providing such content may determine to place such content at a location close to the users. Such a location may be, for example, cache 56 associated with user base 58, cache 64 associated with user base 66 or any other location determined by the content provider. In step 96, the preferred content is stored at such determined location. If desired, information regarding the location of the content is transmitted to the ISP(s) with which the particular users are associated. The determination of the location may be based, for example, on the proximity of the location to the users, the number of users currently being served by a particular location and/or the like. For example, if the number of users currently being served by a particular location is such that the addition of other users would result in deterioration in performance, then a different location may be selected.

Figure 4:
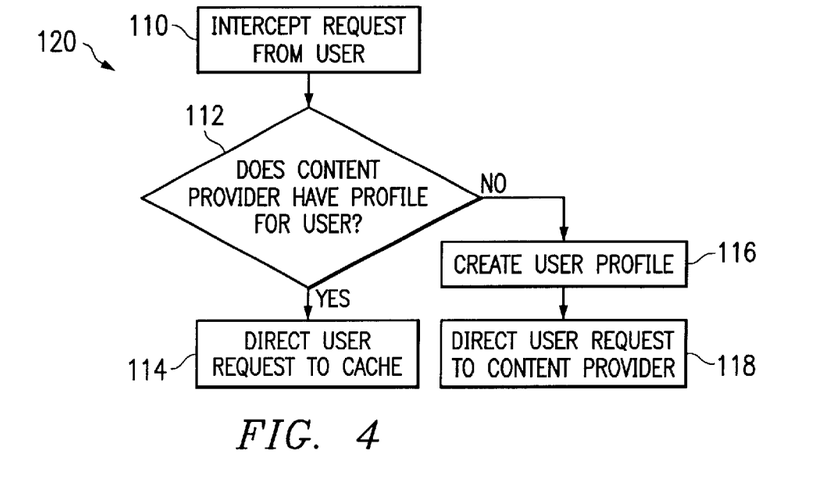
FIG. 4 shows an alternative embodiment flow chart for sender-initiated caching of personalized content.

FIG. 4 shows an alternative embodiment flow chart 120 for sender-initiated caching of personalized content. In the preferred embodiment in step 110, a request for content from a user, preferably personalized content, such as content required in a bandwidth intensive application or service, for example online gaming, is intercepted preferably by an access provider, for example the ISP associated with the user. In step 112, a determination is made, preferably by the ISP, as to whether the content provider has a profile for the particular user. If the content provider has a profile for the particular user, then in step 114, the ISP directs the user request to the nearest cache assigned by the content provider. Since the cache contains content that is personalized, preferably the user request for content is satisfied by the cache itself. Thus, the response time for receiving the requested content by the user is improved. If desired, the user profile may be updated.

However, if the content provider does not have a profile for that particular user, then in step 116, the ISP may create a profile for the user. The profile for the user may be created for example after receiving permission from the user for the creation of the profile. In step 118, the ISP directs the user request for content to the content provider. The content provider preferably provides the requested content to the user. In the preferred embodiment, subsequent requests for content from the user may be directed to the cache in accordance with the flowchart of FIG. 4.

An advantage of the preferred embodiment of the present invention is that by storing content which is personalized to the end user closer to such a user thereby reducing the latency in providing the content to the user, the user can be provided with a better broadband experience. This is especially useful for real-time applications, which require a quick response and/or are bandwidth intensive, such as online gaming. By replicating and distributing content which is personalized to the user closer to the user, the response time to fulfill a request for information can be greatly reduced. The content can be stored in the caches dynamically. The content providers can anticipate a user's need prior to the user making a request for content and have the content available for the user at a cache close to the user. Thus, the user does not have to wait for the content to be fetched from a remote location thereby avoiding or substantially reducing the delays associated with fetching content from the remote location. This benefits the content provider and the ISP as well. Because the content provider can provide content to the user faster, more users will be attracted to the web site of the particular content provider, thereby increasing the user base of the content provider. Moreover, because users subscribing to the ISP get their requests for content satisfied faster, more users will be attracted to the ISP, thereby increasing the ISP's subscriber base.

Another advantage of the preferred embodiment of the present invention is that it allows the user to change access providers, for example when the user moves from one geographical location to another, and still be able to receive personalized content from a source close to the new location. As the content provider has a profile of the user, the content provider can provide personalized content relevant to the user to a cache associated with the new access provider. Thus, a user can move from one location to another and still be able to get the benefits related to having personalized content cached close to the user thereby enhancing the user's experience.

Although in the preferred embodiment described above, the determination as to whether the number of users preferring a particular type of content exceeds a threshold value is made by the content provider, the invention is not so limited and in alternative embodiments, this determination may be made by the access provider itself. In such an embodiment, the access provider itself may make the determination based on the profile of the users in its user base as to the type of content preferred by its users and request that content from the content provider.

Figure 5:
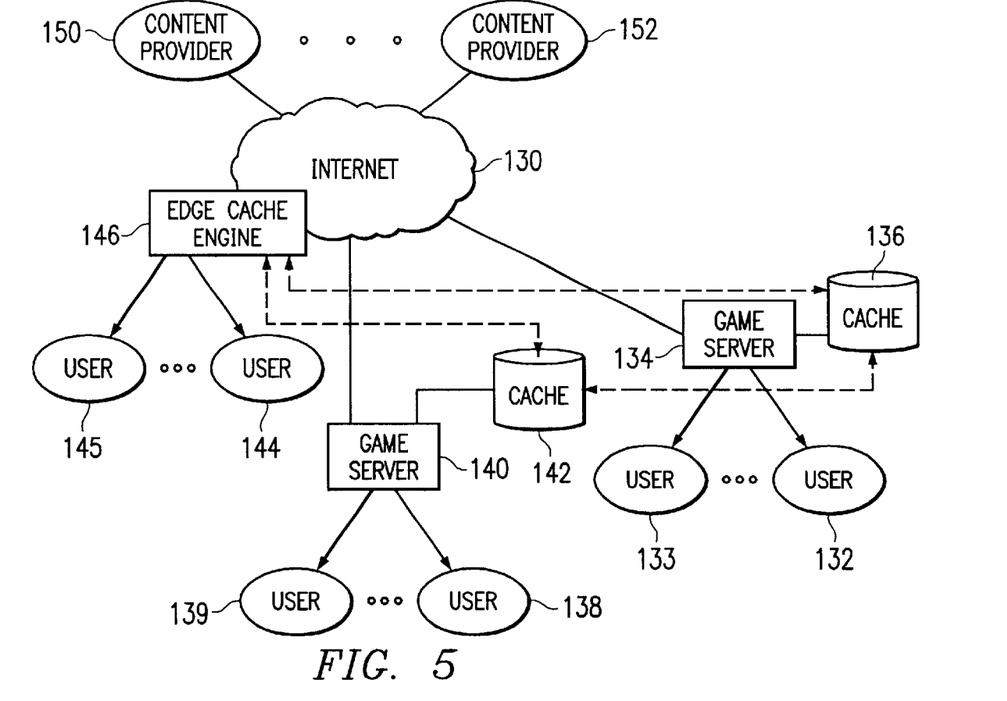
FIG. 5 is a simplified block diagram of the Internet interactive media environment according to an embodiment of the teachings of the present invention.

FIG. 5 is a simplified block diagram of the Internet interactive media environment according to an embodiment of the teachings of the present invention. Coupled to the Internet 130 are a number of game servers 134 and 140, which may include gaming engines. Each game server is associated with one or more web caches 136 and 142 from which it may retrieve web content or media session software provided by content providers 150 and 152 via the Internet. In addition, there may be edge cache engines 146 coupled to the Internet which also stores web content or media session software. A cache engine or cache server is typically defined as a carrier-class, high-speed dedicated Internet appliance that performs web content caching and retrieval. The media session software includes on-line interactive media session software, gaming software and other dynamic applications requiring large bandwidth for content delivery. Users 132, 133, 140, 142, 144, and 145 access the on-line interactive media session software and on-line media session via their respective local game servers.

Web caches and cache engines communicate with routers, which redirects web requests to the cache engine or web cache using protocols such as the Web Cache Control Protocol (WCCP). The edge cache engine or web cache then transmits the requested content to the user. Currently, the caches may periodically update or refresh the data. Some web content may also include an expiration timestamp, so that the cache automatically fetch and refresh the content when the expiration date is reached. However web caching, by definition, is best suited to those applications that are not dynamic so that multiple requests for the same site can take advantage of already cached content close to the users to improve content delivery speed. However, the present invention takes advantage of the benefits of web caching and applies it to dynamic real-time online web content to improve content delivery time.

Figure 7:
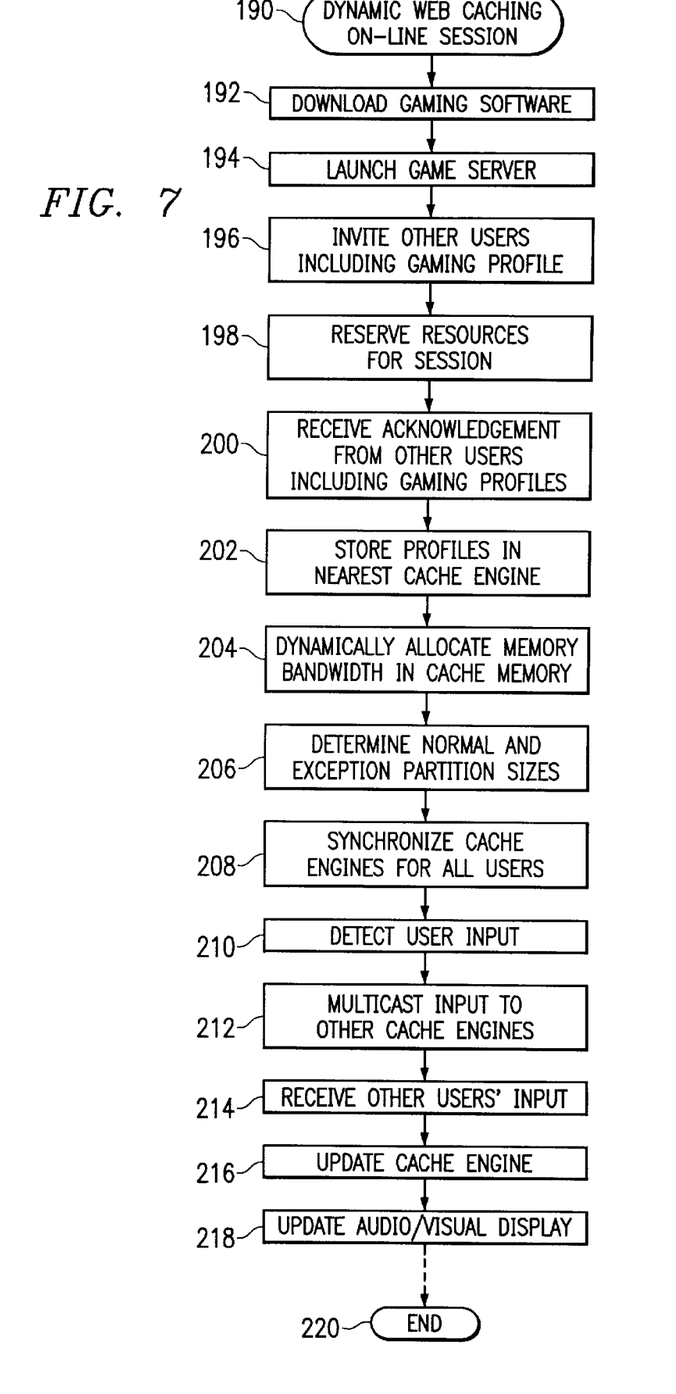
FIG. 7 is a simplified flowchart of an embodiment of a dynamic web caching on-line session according to the teachings of the present invention.

Referring now to FIG. 7, which shows a simplified flowchart of an embodiment of a dynamic web caching on-line session 190 according to the teachings of the present invention. The users each first downloads the online session software application from either edge cache engine 146 or game servers 140 and 134, as shown in block 192. The terms online media session or gaming session are herein defined as any online interactive communication session over a computer network in which one or more users enters input based on displayed content, and content is in turn displayed based on user input. One of the users then launches the game server and invites other users using protocols such as SIP (Session Initiation Protocol) and on-demand multicasting, as shown in blocks 194 and 196. For example, as part of the initiation process the user sends an SIP INVITE with SDP (Session Description Protocol) for exchanging user capability, which includes codes for audio and video UDP ports for voice, video and gaming control messages, as well as for exchanging user profile, which includes information about the user's game personality, tendencies, preferences, etc. The user's profile can be obtained by using user questionnaires or by interactively studying the user's inputs or interaction in response to certain gaming situations. The gaming engine may include a behavior monitor (not shown), which monitors the end user's behavior or activities during a communication or gaming session. The behavior monitor may detect and record how the user plays or behaves in an interactive communication session or game, such as the user's movement input, type of weapon, hand-and-eye coordination, aiming accuracy, reaction time, skill level, aggressiveness, etc.

Figure 6:
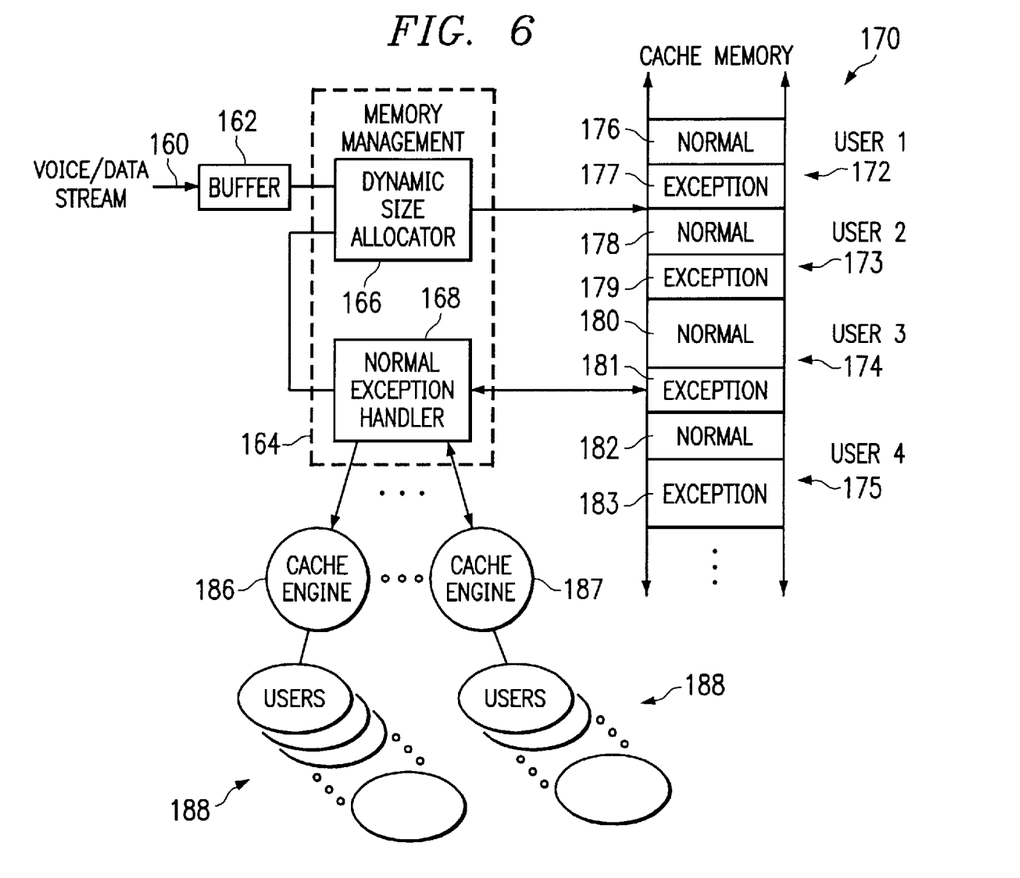
FIG. 6 is a simplified block diagram of a web cache memory scheme according to an embodiment of the teachings of the present invention.

After the session initiation and capabilities exchange phase, the game server initiates the resource reservation phase for packet cable by using DQoS, as shown in block 198. After the resource reservation phase, acknowledgement from other users, including their gaming profiles, are received by the user, as shown in block 200. As shown in FIG. 6, cache memory space 170 is dynamically allocated by a dynamic size allocator 166 of a memory manager 164 in each cache engine (186 and 187) identified to be the closest to the respective users 188. The allocated memory space at each cache engine is used to store the information of the gaming session, including the gaming profiles of all the participating users, as shown in block 202. Cache memory 170 is dynamically allocated for each user (172–175), which includes a normal section (176, 178, 180, and 182) and an exceptions section (177, 179, 181, and 183), as shown in blocks 204 and 206. The normal section is used to store predictable or anticipated user inputs or moves and other gaming information in view of the user's gaming profile. The exception section is used to store those user inputs or moves that are unpredictable. The sizes of the normal and exception memory space are continually and dynamically adjusted based on the users' monitored behavior. Note that in an online session such as a gaming session, the number of moves that a player can make from any one point or game state is finite. For example in a role-playing type of game where the goal is to overcome enemies, a player may be able to advance, back up, turn left, turn right, jump up and/or jump down, use one of the weapons at his/her disposal, etc. These possible moves are then divided into predictable or unpredictable moves when the user's profile is taken into account. For example, an aggressive player is more likely to use his weapon when faced with an enemy in front of him rather than to retreat. Whether a user's input is predictable or unpredictable is dependent on a number of factors, such as the current state of the user's game, the current state of other users' game, statistical calculations, and prediction algorithms. The users' web cache engines are synchronized so that inter-cache communication can be executed very quickly or in real-time, as shown in block 208.

It is contemplated by the present invention that predictable user entries are behaviors known by an intelligent agent deployed in the memory manager (not shown). Artificial intelligence techniques such as deterministic algorithms are used to determine users' predictable behaviors. Deterministic algorithms use a set of variables as the input and then use some rules based on user's behavior or some other pattern to drive the computer-controlled game elements or objects based on these inputs. Prediction algorithms may also use heuristic search algorithms, neural networks, genetic algorithms, temporal differences, genetic and evolutionary algorithms, and other methods. The category of algorithms to be used for predictable user entries involve cognitive gaming theory to learn the behavior of the users by some intelligent agent in the game over periods of time and then apply it to moves in a particular game. An article reporting on the research in predicting a user's moves is Erev, Ido and Roth, Alvin E., *Predicting How People Play Games: Reinforcement Learning in Experimental Games With Unique, Mixed Strategy Equilibria*, American Economic Review, 88, 4, September 1998, 848–881.

Unpredictable user entries refer to those users whose pattern or behavior is not known so that some random intelligent logic needs to be applied when an intelligent agent does not have enough information to determine the solution. The intelligent agent then may select a random behavior that may become the correct solution for the situation.

Continuing to refer to FIGS. 6 and 7, during the online session, the user's input is monitored by the user's respective cache engine 186 and 187, as shown in block 210. The user's moves, input or behavior 160 is received and temporarily stored by a buffer 162. It is then sent to memory manager 164 for processing. If a user's action or move during the online session is a predictable or an unpredictable one, the user's cache engine multicasts this information to the other cache engines of other users participating in the same online session, as shown in block 212. The multicasted information may include the user's identity, whether the user's input was predictable or not predictable, and perhaps an index or other keys to the user's cache memory space, so that all the cache engines may fetch the same user move from the respective cache memories. Using the user's identity and the predictable or unpredictable information, the cache engine of each respective user is operable to retrieves the predictable or unpredictable move for the user from the normal or exception section of the cache memory space of that user. The retrieved move is then used to update the displayed content. At the same time, the cache engine also receives multicast information from other users' cache engines, as shown in block 214. The cache memory content is updated upon every user move or input, as shown in block 216. The retrieved user moves or input are used to update the displayed content, as shown in block 218. During the online session, users may communicate with other users via voice, music, messaging, or video streams. This inter-user communication data is multicast to the other users. The process continues until the online session is terminated by the users, as shown in block 220.

Time is a critical factor for dynamic size allocator 166. There are many suitable allocator schemes such as sequential fits including first fit, address-ordered first fit, next fit, best fit and worst fit. In an embodiment of the present invention, the address-ordered first fit scheme is used to allocate free memory. The data structure used to store this free memory list can be a linear list implementation, segregated free list, buddy system or indexed fits. The speed requirement tend to suggest the segreted free list data structure, which uses an array of free lists where each list holds free blocks of a particular size. When a block of memory is freed, it is simply pushed onto the free list for that size. When a request for a given size arrives, an array list for the appropriate size of memory is looked to service the request. There are several variations on this segregated free lists scheme that can be used. This memory allocation may also followed by a deferred coalescing scheme to actually merge the free blocks. The allocator can be compiled together with the application program (may be gaming, video conferencing etc), rather than linked as a library in the usual way to find how much memory to be allocated for a particular application for a session involving some x number of users. These normal and exception entries in the memory can be filled by prediction algorithm's output which can be part of normal/exception handler system or standalone system that communicates with Normal/Exception handler.

Because the present invention makes statistical predictions of a user's input and behavior based on known user profile information, categorizes the input and behavior as predictable or unpredictable (based on the user's profile), and caches these moves in separate sections, the transmission or multicast of the user's specific input to all the other users is no longer necessary. Rather, because each user's cache engine has the same set of information and are synchronized, only a small amount of information need to be transmitted in order to update everyone's display and game state. This property makes the online sessions less dependent on network bandwidth and traffic usage and therefore can be more interactive and dynamic in a real-time fashion. The user behavior or input data in the cache memories may be stored in an easily searchable data structure such as a binary tree. The SIP multicast protocol may be used to synchronize the distributed cache engines to make graphic rendering appear simultaneous for the users. As a result, the overall functionality of the web caching concept is greatly improved to handle the dynamic memory allocation and to facilitate the normal and exception conditions during the online session. Implemented in this manner, the online session environment becomes significantly more realistic, dynamic and real-time. The users are therefore more likely to be totally immersed in this environment and online community, which contributes to the hit statistics and "stickiness" of the web site.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A system, comprising:
 a plurality of cache engines coupled to a computer network;
 a cache memory associated with each of the plurality of cache engines, the cache memory being allocated to store information of a plurality of users participating in an online communication session, each user being allocated a normal section and an exception section in the cache memory, the normal section storing predictable behavior of the user and the exception section storing unpredictable behavior of the user.

2. The system, as set forth in claim 1, wherein each cache engine comprises a dynamic size allocator operable to determine the sizes of each user's normal section and exception section.

3. The system, as set forth in claim 1, wherein each cache engine comprises a normal/exception handler operable to determine whether a user's behavior is predictable or unpredictable and which cached user behavior is to be multicasted to the other users.

4. The system, as set forth in claim 3, wherein the normal/exception handler sends the user's identity and whether the behavior was predictable or unpredictable.

5. The system, as set forth in claim 1, wherein each cache engine comprises a memory manager operable to determine the sizes of each user's normal section and exception section, and determine whether a user's behavior is predictable or unpredictable and which cached user behavior is to be multicasted to the other users.

6. A cache engine, comprising:
 a cache memory being allocated to store information of a plurality of users participating in an online communication session, each user being allocated a normal section and an exception section in the cache memory, the normal section storing predictable behavior of the user and the exception section storing unpredictable behavior of the user; and
 a normal/exception handler operable to determine whether a user's behavior is predictable or unpredictable and which cached user behavior is to be multicasted to the other users.

7. The cache engine, as set forth in claim 6, comprising a dynamic memory size allocator operable to determine the sizes of each user's normal section and exception section in the cache memory.

8. The cache engine, as set forth in claim 6, wherein the cache engine synchronizes with cache engines associated with the plurality of users participating in the online communication session.

9. A method comprising:
 allocating cache memory space for each of a plurality of users participating in an online communication session;
 dividing the allocated cache memory space for each user into a normal section for storing predictable user behavior and an exception section for storing unpredictable user behavior; and
 synchronizing the online communication session for all the users by sending information regarding whether a specific user's behavior is predictable or unpredictable and retrieving appropriate cached user behavior.

10. The method, as set forth in claim 9, wherein synchronizing the online communication session comprises:
 receiving the information that the specific user's behavior is predictable;
 retrieving the specific user's predictable behavior from the normal section of the cache memory; and
 updating the online communication session by updating a current state of the specific user by the retrieved predictable behavior.

11. The method, as set forth in claim 9, wherein synchronizing the online communication session comprises:
 receiving the information that the specific user's behavior is unpredictable;
 retrieving the specific user's unpredictable behavior from the exceptions section of the cache memory; and updating the online communication session by updating a current state of the specific user by the retrieved unpredictable behavior.

12. The method, as set forth in claim 9, further comprising determining each user's predictable and unpredictable behavior based on monitored past user behavior.

13. The method, as set forth in claim 9, further comprising determining each user's predictable and unpredictable behavior based on the user's profile information.

14. The method, as set forth in claim 9, further comprising:
- monitoring at least one user's behavior during the online communication session;
- determining whether it is a predictable behavior or an unpredictable behavior; and
- multicasting the predictable or unpredictable information to other users also participating in the online communication session.

15. The method, as set forth in claim 14, wherein multicasting the predictable or unpredictable information comprises multicasting the specific user's identifier to the other users.

16. The method, as set forth in claim 9, dynamically adjusting the cache memory space allocated for each user participating in the online communication session.

17. The method, as set forth in claim 9, further comprising downloading a gaming software for an online gaming session from the cache engine.

18. The method, as set forth in claim 17, further comprising:
- launching a game server by a user;
- inviting other users to the online gaming session; and
- receiving user profiles from participating users in the cache engine.

19. A computer-readable medium storing a method comprising:
- determining in a cache memory space a normal section memory size for storing predictable player behavior and an exception section memory size for storing unpredictable player behavior for each player participating in an online gaming session;
- dynamically allocating the cache memory space for each of a plurality of players;
- synchronizing the online gaming session display for all the players by sending information regarding whether a specific player's behavior is predictable or unpredictable, multicasting this information, and retrieving appropriate locally cached player behavior in response to the multicasted information.

20. The method, as set forth in claim 19, wherein synchronizing the online gaming session comprises:
- receiving the information that the specific player's behavior is predictable;
- retrieving the specific player's predictable behavior from the normal section of the cache memory; and
- updating the online communication session by updating a current state of the specific player by the retrieved predictable behavior.

21. The method, as set forth in claim 19, wherein synchronizing the online gaming session comprises:
- receiving the information that the specific player's behavior is unpredictable;
- retrieving the specific player's unpredictable behavior from the exceptions section of the cache memory; and
- updating the online communication session by updating a current state of the specific player by the retrieved unpredictable behavior.

22. The method, as set forth in claim 19, further comprising determining each player's predictable and unpredictable behavior based on monitored past player behavior.

23. The method, as set forth in claim 19, further comprising determining each player's predictable and unpredictable behavior based on the player's profile information.

24. The method, as set forth in claim 19, further comprising:
- monitoring at least one player's behavior during the online communication session;
- determining whether it is a predictable behavior or an unpredictable behavior; and
- multicasting the predictable or unpredictable information to other players also participating in the online communication session.

25. The method, as set forth in claim 24, wherein multicasting the predictable or unpredictable information comprises multicasting the specific player's identifier to the other players.

26. The method, as set forth in claim 19, dynamically adjusting the cache memory space allocated for each player participating in the online communication session.

27. The method, as set forth in claim 19, further comprising downloading a gaming software for an online gaming session from the cache engine.

28. The method, as set forth in claim 27, further comprising:
- launching a game server by a player;
- inviting other players to the online gaming session; and
- receiving user profiles from participating players in the cache engine.

* * * * *